(12) United States Patent
Tamugi

(10) Patent No.: US 9,669,662 B2
(45) Date of Patent: Jun. 6, 2017

(54) PNEUMATIC TIRE

(75) Inventor: Akihiro Tamugi, Kobe (JP)

(73) Assignee: SUMITOMO RUBBER INDUSTRIES, LTD., Kobe-Shi (JP)

(*) Notice: Subject to any disclaimer, the term of this patent is extended or adjusted under 35 U.S.C. 154(b) by 1167 days.

(21) Appl. No.: 13/616,252

(22) Filed: Sep. 14, 2012

(65) Prior Publication Data

US 2013/0068360 A1   Mar. 21, 2013

(30) Foreign Application Priority Data

Sep. 16, 2011 (JP) ................................ 2011-203588

(51) Int. Cl.
*B60C 11/117* (2006.01)
*B60C 11/03* (2006.01)
*B60C 11/12* (2006.01)

(52) U.S. Cl.
CPC .......... *B60C 11/0306* (2013.04); *B60C 11/12* (2013.01); *B60C 2011/0346* (2013.04); *B60C 2011/0358* (2013.04); *B60C 2011/0365* (2013.04); *B60C 2011/0381* (2013.04); *B60C 2011/0388* (2013.04); *B60C 2200/14* (2013.04)

(58) Field of Classification Search
CPC ..... B60C 2011/0365; B60C 2011/0381; B60C 2011/0388; B60C 2011/0346; B60C 2011/0358; B60C 2011/0386; B60C 2200/14; B60C 2200/06; B60C 11/0306; B60C 11/12; B60C 11/0309; B60C 11/03; B60C 11/1236; B60C 11/01; B60C 11/11

USPC ........................................... 152/209.3, 209.2
See application file for complete search history.

(56) References Cited

U.S. PATENT DOCUMENTS

| D647,034 S * | 10/2011 | Iwasaki | D12/586 |
| D647,465 S * | 10/2011 | Iwasaki | D12/586 |
| 2004/0020577 A1 | 2/2004 | Hirai | |
| 2005/0076985 A1 * | 4/2005 | Colombo | B60C 11/0302 152/209.18 |
| 2009/0255614 A1 * | 10/2009 | Ebiko | B60C 11/0302 152/209.8 |

* cited by examiner

*Primary Examiner* — Michael H Wilson
*Assistant Examiner* — Philip N Schwartz
(74) *Attorney, Agent, or Firm* — Birch, Stewart, Kolasch & Birch, LLP

(57) ABSTRACT

A pneumatic tire comprises shoulder land zones and middle land zones divided by shoulder main grooves and a crown main groove. The shoulder land zone is divided by shoulder lateral grooves into shoulder blocks. The middle land zone is formed as a circumferential rib in substance. The middle land zone is provided with first and second middle outward slots which extend from the shoulder main groove toward the axially inside beyond the widthwise center line of the middle land zone, while gradually decreasing the width and inclining with respect to the tire axial direction at an angle θ1 and an angle θ2 (θ2>θ1), respectively, and terminate within the middle land zone. The open ends of the first and second middle outward slots respectively face the open ends of the shoulder lateral grooves at the shoulder main groove.

16 Claims, 6 Drawing Sheets

PNEUMATIC TIRE

BACKGROUND OF THE INVENTION

The present invention relates to a pneumatic tire, more particularly to a tread pattern capable of satisfying both of the mud performance and noise performance.

Pneumatic tires for 4WD vehicles for use on paved or public roads as well as off paved roads, e.g. sport-utility vehicles, pickup trucks and the like, are required to have a good mud performance capable of producing a large drive power on muddy roads and a good noise performance capable of generating less noise during running on the smooth and well-paved city streets and the like.

In Japanese Patent Application Publication No. 2004-058839 corresponding to US Patent Application Publication No. 2004-0020577-A1, in order to satisfy both of mud performance and noise performance, as shown in FIG. 6, the tire has shoulder land zones rs and middle land zones rm divided by shoulder main grooves gs and crown main grooves gc; the shoulder land zones rs are divided by shoulder lateral grooves ys into rows of shoulder blocks bs; the middle land zones rm are formed as circumferential ribs; and the middle land zone rm is provided with inclined middle outward slots c1 extending from the shoulder main groove gs toward the axially inside, and inclined middle inward slots c2 extending from the crown main groove gc toward the axially outside. Further, the shoulder lateral grooves ys include first shoulder lateral grooves ys1 and second shoulder lateral grooves ys2 having different groove widths. In the vicinity of the tread edge to which contributes to the mud performance, in order to improve the mud performance, the groove width WLo of the first shoulder lateral groove ys1 is set to be larger than the groove width WSo of the second shoulder lateral groove ys2. On the other hand, in the vicinity of the connections between the lateral grooves ys1 and ys2 and the crown main groove gc which contributes to the noise performance, the groove width WLi of the first shoulder lateral grooves ys1 is set to be closer to the groove width WSi of the second shoulder lateral grooves ys2 in order to decrease the groove volume and thereby improve the noise performance. Therefore, in comparison with the conventional tire, the total groove volume of the shoulder lateral grooves is decreased and thereby the noise performance can be improved, and at the same time, it is possible to maintain the mud performance nearly equal to that of the conventional tire. Thus, this prior art is directed to the improvement in the shoulder land zones, therefore, there is room for improvement.

SUMMARY OF THE INVENTION

It is therefore, an object of the present invention to provide a pneumatic tire which can be further improved in the mud performance and noise performance, by improving the configurations of slots disposed in middle land zones and the arrangement of the slots in relation to shoulder lateral grooves disposed in shoulder land zones.

According to the present invention, a pneumatic tire comprises a tread portion provided with circumferentially extending main grooves, wherein the main grooves are
a pair of shoulder main grooves disposed one on each side of the tire equator to define a shoulder land zone axially outside each said shoulder main groove, and
one or two crown main grooves disposed between the shoulder main grooves to define a middle land zone between each of the shoulder main grooves and the adjacent crown main groove, each of the shoulder land zones is provided with shoulder lateral grooves extending axially outwardly from the shoulder main groove to the adjacent tread edge so that the shoulder land zone is divided into circumferentially arranged shoulder blocks in a row, each of the middle land zones is provided with first middle outward slots and second middle outward slots which are arranged alternately in the tire circumferential direction, the first middle outward slots extend from the shoulder main groove toward the axially inside beyond the widthwise center line of the middle land zone, while gradually decreasing the width and inclining with respect to the tire axial direction at an angle θ1, and terminate within the middle land zone, the second middle outward slots extend from the shoulder main groove toward the axially inside beyond the widthwise center line of the middle land zone, while gradually decreasing the width and inclining with respect to the tire axial direction at an angle θ2 more than the angle θ1 toward the same direction as the first middle outward slots, and terminate within the middle land zone, each of the middle land zones is not provided with any lateral groove extending across the entire width of the middle land zone and having a groove width of not less than 2 mm along its length so that the middle land zone is formed as a circumferential rib in substance, and the open ends of the first and second middle outward slots at the shoulder main groove respectively face the open ends of the shoulder lateral grooves at the shoulder main groove.

The pneumatic tire according to the present invention may be further provided with the following optional features:

each of the middle land zones is further provided with middle inward slots, the middle inward slots extend from the crown main groove toward the axially outside beyond the widthwise center line of the middle land zone and terminate within the middle land zone;

the shoulder lateral grooves are wide shoulder lateral grooves and narrow shoulder lateral grooves which are arranged alternately in the tire circumferential direction, and the wide shoulder lateral groove has an average groove width more than that of the narrow shoulder lateral groove;

the open ends of the first middle outward slots respectively face the open ends of the wide shoulder lateral grooves; and the axially inner ends of the first middle outward slots or alternatively the axially inner ends of the second middle outward slots are connected to the crown main groove through sipes having a groove width of less than 2 mm.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used. The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like. In case of passenger car tires, however, the standard pressure and standard tire load are uniformly defined by 180 kPa and 88% of the maximum tire load, respectively.

The tread edges are the axial outermost edges of the ground contacting patch (camber angle=0) in the normally inflated loaded condition.

The term "groove" is meant for a groove having a groove width of not less than 2 mm, and the term "sipe" is used to refer to a very narrow groove or cut having a groove width of less than 2 mm. A land zone crossed by lateral grooves is called a block row or a row of blocks. A land zone crossed by sipes only is called a circumferential rib 21.

DESCRIPTION OF THE PREFERRED EMBODIMENTS

Figure 1:
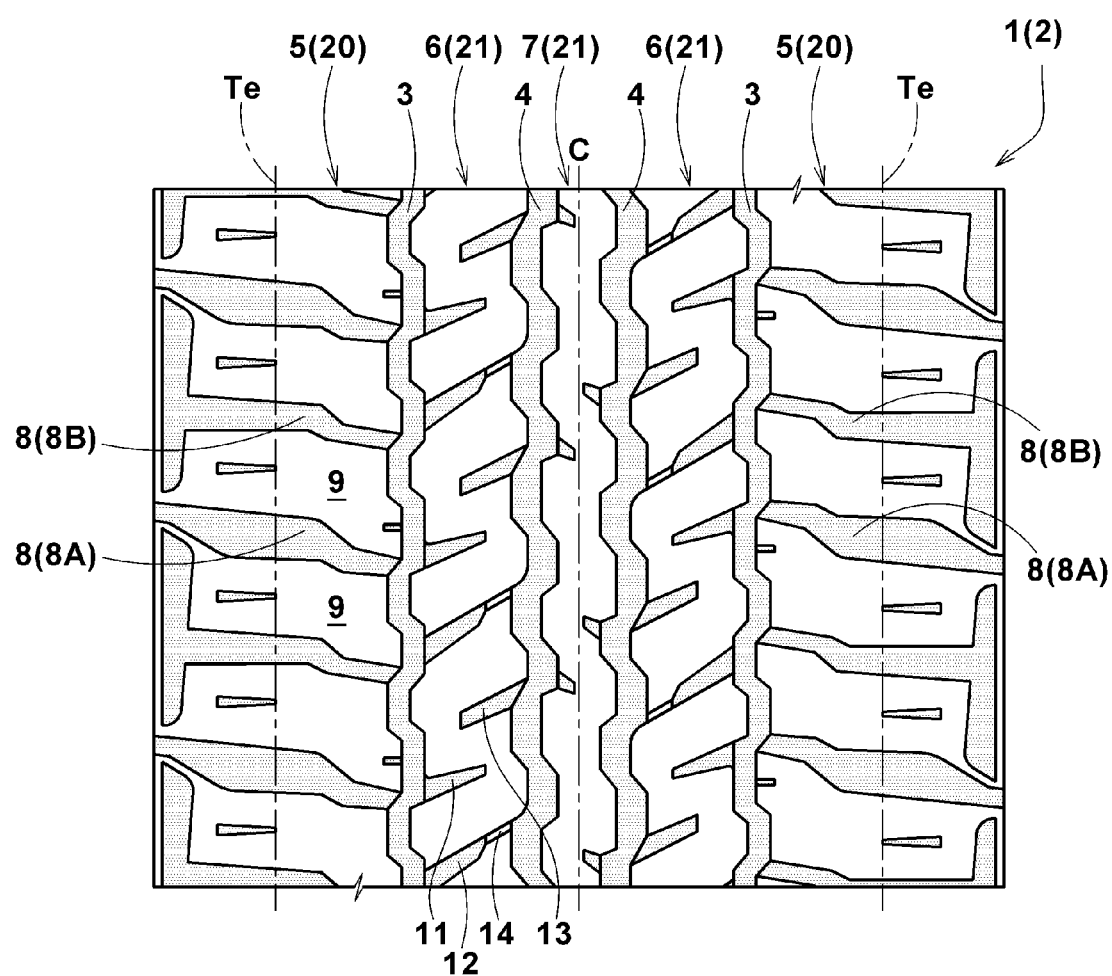
FIG. 1 is a developed partial view of the tread portion of a pneumatic tire as an embodiment of the present invention.

Embodiments of the present invention will now be described in detail in conjunction with accompanying drawings.

The pneumatic tire according to the present invention comprise, as usual, a tread portion 2, a pair of axially spaced bead portions each with a bead core therein, a pair of sidewall portions extending between the tread edges and the bead portions, a carcass extending between the bead portions, and a tread reinforcing belt disposed radially outside the carcass in the tread portion.

The tread portion 2 is provided with circumferentially extending main grooves 3 and 4. The main grooves 3 and 4 are a pair of shoulder main grooves 3 disposed one on each side of the tire equator and one or two crown main grooves 4 disposed between the shoulder main grooves 3. Thereby, a shoulder land zone 5 is defined on the axially outside of each of the shoulder main grooves 3, and a middle land zone 6 is defined between each of the shoulder main grooves 3 and the adjacent crown main groove 4. Further, in the case of the two crown main grooves 4, a crown land zone 7 is defined between the crown main grooves 4.

Each of the shoulder land zones 5 is provided with shoulder lateral grooves 8 having a groove width of not less than 2 mm and extending axially outwardly from the shoulder main groove 3 beyond the tread edge Te so that the shoulder land zone 5 is divided into circumferentially arranged shoulder blocks 9 in a row 20.

Each of the middle land zones 6 and crown land zone 7 is not crossed by any lateral groove having a groove width of not less than 2 mm, and each zone is formed as a circumferential rib 21 continuous in the tire circumferential direction in substance.

The shoulder main grooves 3 and crown main groove 4 each have a groove width of not less than 7.0 mm. Each may be formed as a straight groove or a zigzag groove.

In this embodiment, each of the shoulder main grooves 3 and crown main grooves 4 is a zigzag groove having a trapezoidal waveform made up of a first oblique segment K1, a first straight segment T1, a second oblique segment K2 and a second straight segment T2 which are, as a unit P, repeated in this order in a tire circumferential direction.

Figure 4:
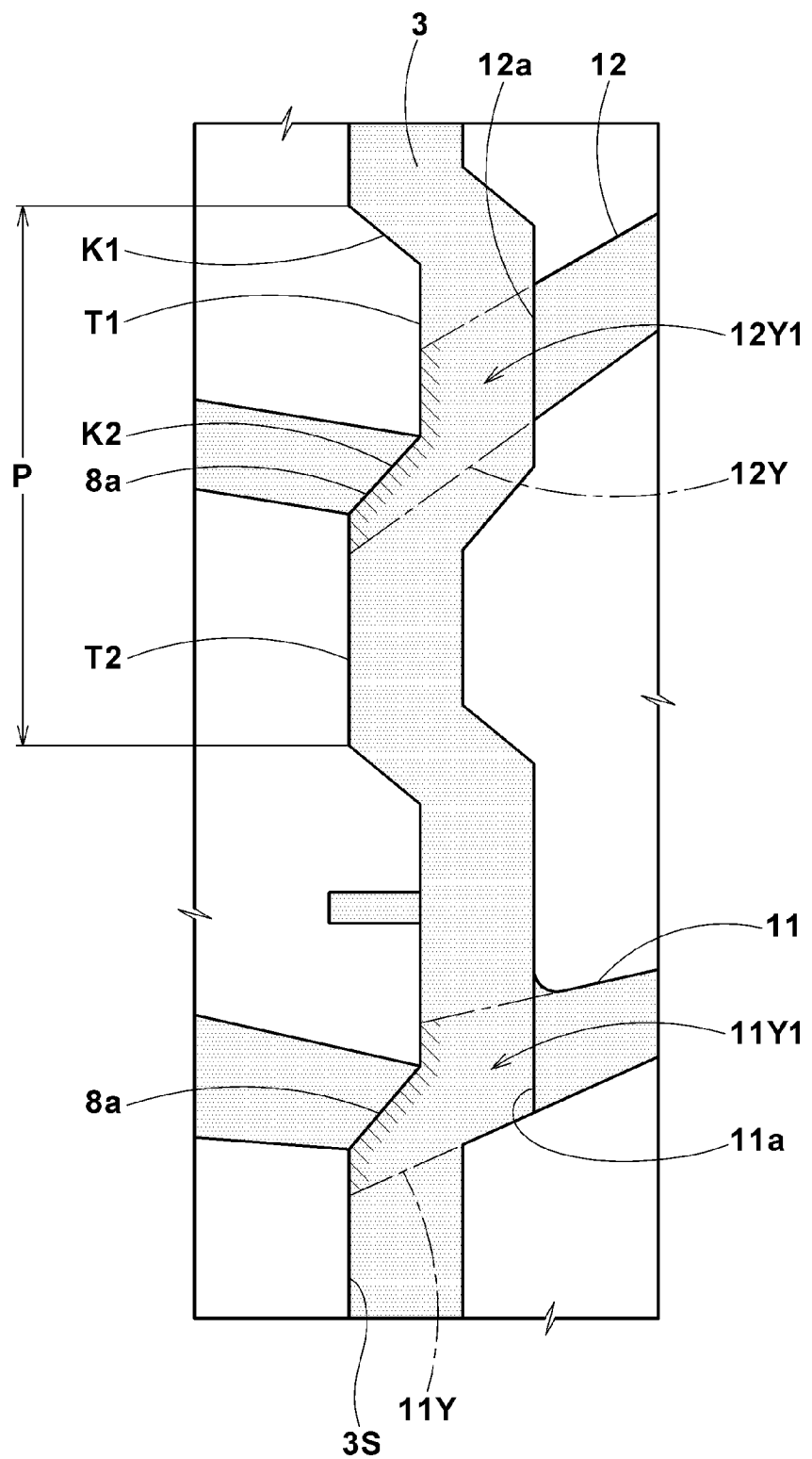
FIG. 4 is a plan view of a zigzag groove in a trapezoidal waveform.
Figure 5A:
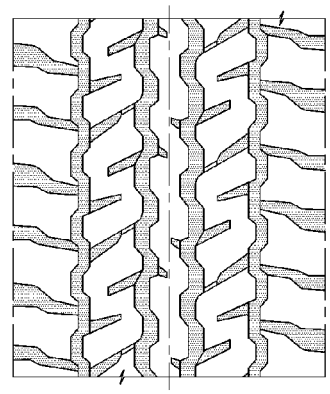
FIGS. 5(A), 5(B), 5(C) and 5(D) are developed partial views of the tread portions of pneumatic tires as comparative examples.
Figure 5B:
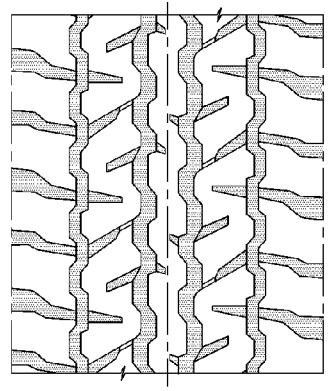
Figure 5C:
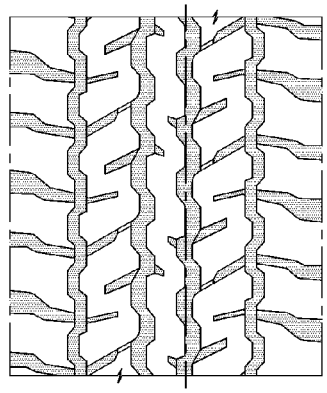
Figure 5D:
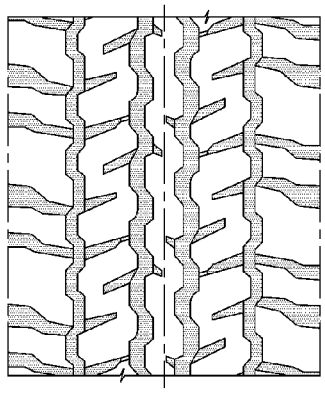
Figure 6:
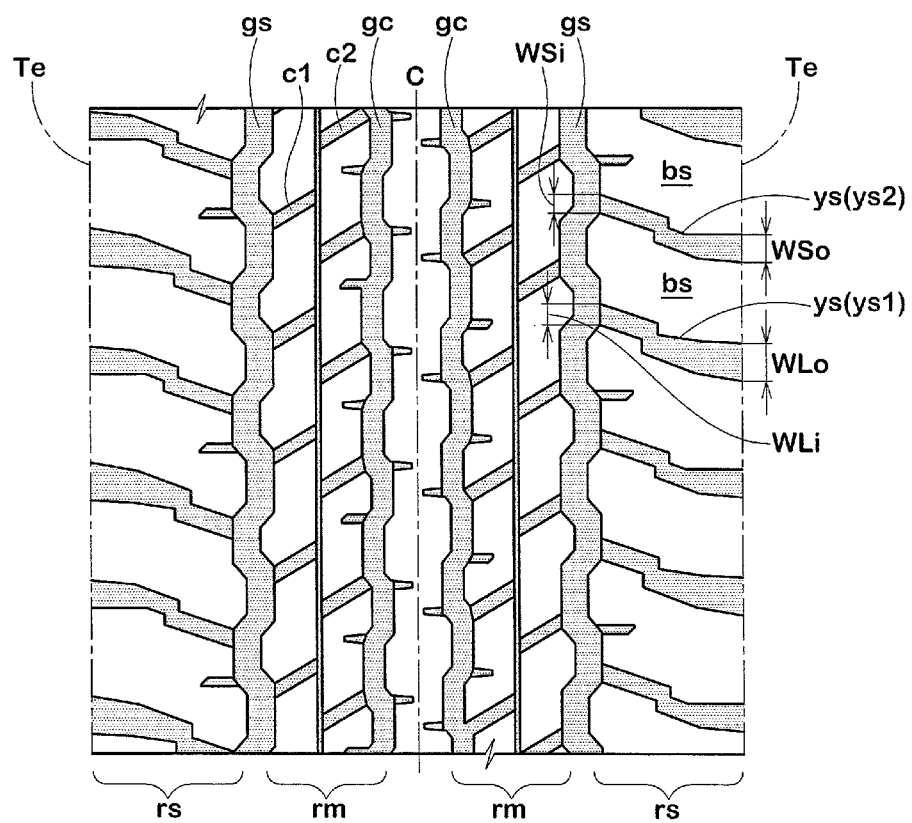
FIG. 6 is a developed partial view of the tread portion of the prior art tire.

As shown in FIG. 4, the first straight segments T1 and the second straight segments T2 extend straight in parallel with the tire circumferential direction and are staggered so that the first straight segments T1 are on the tire equator side of the second straight segments T2.

The first oblique segments K1 extends between the straight segments T1 and T2 while inclining with respect to the tire circumferential direction.

The second oblique segments K2 extends between the straight segments T1 and T2 while inclining with respect to the tire circumferential direction reversely to the first oblique segments K1.

Preferably, the oblique segments K1 and K2 are inclined at angles in a range of from 30 to 60 degrees with respect to the circumferential direction.

In the case of the main groove formed in a trapezoidal waveform, the mud compressed in the oblique segments K1 and K2 produces a shear force or traction force and thereby the mud performance can be improved.

The groove depth of the shoulder main groove 3, the groove depth of the crown main groove 4, and the groove depth of the shoulder lateral groove 8 are preferably set in a range of from 9.0 to 12.0 mm. It is however also possible to use conventionally adopted values for such grooves.

Figure 2:
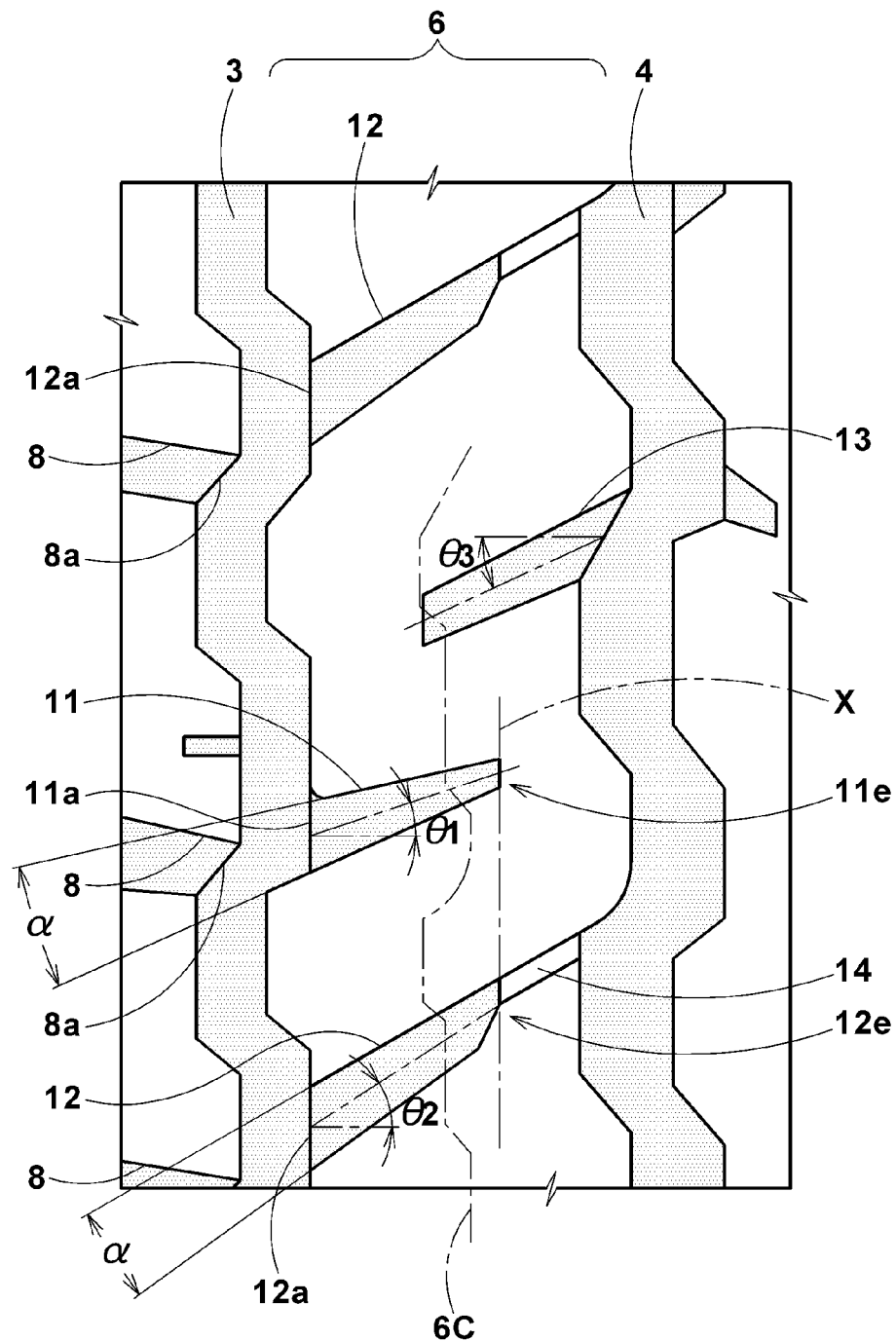
FIG. 2 is an enlarged partial view a middle land zone thereof.

The middle land zone 6 are each provided with first middle outward slots 11 and second middle outward slots 12 which are, as shown in FIG. 2, arranged alternately in the tire circumferential direction.

The first middle outward slot 11 extends from the shoulder main groove 3 toward the axially inside beyond the midpoint 6c of the width of the middle land zone 6 and terminates within the middle land zone 6.

The width of the first middle outward slot 11 is gradually decreased from the shoulder main groove 3 to the axially inner end 11e thereof.

The widthwise center line of the first middle outward slot 11 is inclined with respect to the tire axial direction at a non-zero angle θ1.

The second middle outward slot 12 from the shoulder main groove 3 toward the axially inside beyond the midpoint 6C of the width of the middle land zone 6 and terminates within the middle land zone 6.

The width of the second middle outward slot 12 is gradually decreased from the shoulder main groove 3 to the axially inner end 12e thereof.

The widthwise center line of the second middle outward slot 12 is inclined with respect to the tire axial direction at an angle θ2 more than the angle θ1.

In the first and second middle outward slots 11 and 12 in this embodiment, the axially inner ends 11e of the slots 11 and the axially inner ends 12e of the slots 12 are located on a circumferential line x namely, located at the same axial position on each side of the tire equator.

The angle θ1 is constant namely, the slot 11 extends straight.

The angle θ2 is constant namely, the slot 12 extends straight.

The angle θ1 is in a range of from 5 to 20 degrees.

The difference (θ2−θ1) of the angle θ2 from the angle θ1 is in a range of from 10 to 35 degrees.

In connection with the rate of gradual decrease in the groove width of each slot 11, 12, it is preferable that the taper angle α between both sidewalls of the slot is in a range of from 5 to 15 degrees.

The open ends 11a and 12a of the first and second middle outward slots 11 and 12 at the shoulder main groove 3 respectively face the open ends 8a of the shoulder lateral groove 8 at the shoulder main groove 3.

More specifically, as shown in FIG. 4, when the sidewalls of the first/second middle outward slot 11/12 are extended to the axially outer sidewall 3s of the shoulder main groove 3, a region 11Y1/12Y1 between their intersections (shaded area) overlap one of the open ends 8a partially, preferably wholly. The open ends 11a and 12a of the first and second middle outward slots 11 and 12 are each located within one of the first straight segments T1 of the shoulder main groove 3.

The open ends 8a of the shoulder lateral grooves 8 are respectively located in the first oblique segments K1 of the shoulder main groove 3 or alternatively the second oblique segments K2.

As described above, since the first and second middle outward slots 11 and 12 are terminated within the middle land zone 6, during running on rough terrain, the mud in the slots 11 and 12 is prevented from being discharged toward the tire equator side where the ground pressure is higher.

Further, since the first and second middle outward slots 11 and 12 are gradually decreased in the width toward the axially inside and inclined at the angles θ1 and θ2 with respect to the tire axial direction, during the tire is rotated, the mud in the slots 11 and 12 is forced by the ground toward the axially outward direction in which the groove width increases so that the mud can be easily ejected.

Furthermore, the axially outer open ends 11a and 12a of the first and second middle outward slots 11 and 12 respectively face the axially inner open ends 8a of the shoulder lateral grooves 8, therefore, the mud in the middle outward slots 11 and 12 can be discharged to the shoulder main groove 3 as well as the shoulder lateral grooves 8.

By these synergistic effects, the mud ejecting performance is effectively improved, and as a result, the road surface from which mud is removed and the middle land zone 6 which is formed as a circumferential rib 21 having a higher rigidity can well contact with each other.

As a result, the adhesion/shear force between the ground contacting surface and the mud is increased, and the traction force is increased to improve the mud performance.

Since the widths of the first and second middle outward slots 11 and 12 are gradually varied, the mud ejecting performance can be increased within a limited groove volume.

Since the first and second middle outward slots 11 and 12 are inclined to the same direction, they do not interfere with each other to deteriorate the mud ejecting performance.

Since the first and second middle outward slots 11 and 12 have different inclination angles θ1 and θ2, the noise during running on smooth and well-paved roads is dispersed and, under diversified conditions, mud ejecting can be secured.

If the angle θ1 becomes less than 5 degrees and/or the taper angle α becomes less than 5 degrees, then the effect to improve the mud ejecting performance is decreased. If the angle θ1 exceeds 15 degrees, then the traction force decreases. If the taper angle α exceeds 15 degrees, since the adhesion/share adhesion/shear force owing to the mud in the slots decreases, the traction force decreases. If the angle difference (θ2−θ1) exceeds 35 degrees, as the inclination of the second middle outward slot 12 is increased, the traction force decreases. If the difference (θ2−θ1) is less than 10 degrees, the effect to disperse the noise is decreased.

The axially inner ends of the first middle outward slots 11 or alternatively of the second middle outward slots 12, in this embodiment the axially inner ends 12e of the second middle outward slot 12, are connected to the crown main groove 4 through connecting sipes 14 having a groove width of less than 2 mm as shown in FIG. 2. Preferably, the connecting sipe 14 extends straight in substantially parallel with the widthwise centerline of the slot.

The connecting sipes 14 may be closed when in the ground contacting patch, therefore the middle land zone 6 may be provided with a rigidity similar to that of a circumferential rib 21. In contrast, when outside the ground contacting patch, the connecting sipes 14 can provide flexibility for the middle land zone 6, and as a result, the mud ejecting performance can be improved.

The middle land zone 6 is further provided with middle inward slots 13. The middle inward slot 13 extends from the crown main groove 4 toward the axially outside beyond the midpoint 6c of the width of the middle land zone 6 and terminates within the middle inward slot 13.

The middle inward slots 13 are inclined in the same direction as the first and second middle outward slots 11 and 12 at an angle θ3 with respect to the axial direction.

In this example, the angle θ3 is not less than the angle θ1 and not more than the angle θ2.

Thus, the number of the slots formed in the middle land zone 6 become more than the number of the shoulder lateral grooves 8, and it becomes possible to improve the noise performance by somewhat decreasing the widths of the slots 11, 12 and 13, while achieving a good mud performance.

It is preferable for the mud ejecting performance that the width of the middle inward slot 13 is gradually decreased toward the axially outside.

The number of the middle inward slots 13, the number of the middle outward slots 11, and the number of the middle outward slots 12 per one middle land zone 6 are the same.

Figure 3:
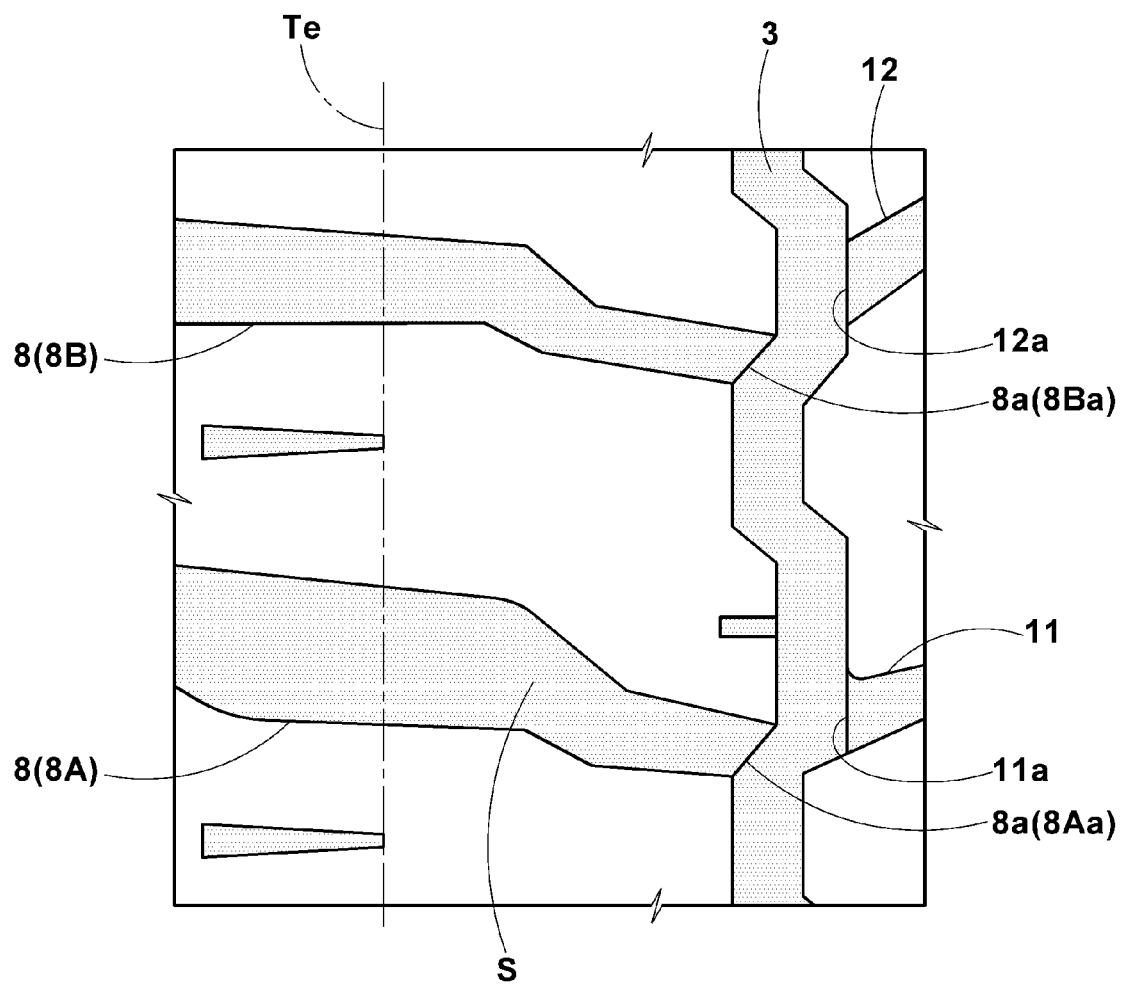
FIG. 3 is an enlarged partial view a shoulder land zone thereof.

The shoulder lateral grooves 8 in this embodiment are, as shown in FIG. 3, wide shoulder lateral grooves 8A and narrow shoulder lateral grooves 8B which are arranged alternately in the tire circumferential direction.

The wide shoulder lateral groove 8A has an average groove width larger than that of the narrow shoulder lateral groove 8B.

Here, the average groove width is defined as the quotient of the area S of the shoulder lateral groove 8 at the groove top measured between the shoulder main groove 3 and the tread edge Te which is divided by the axial length of the shoulder lateral groove 8 measured between the shoulder main groove 3 and the tread edge Te.

In this embodiment, at any axial position, the axial groove width of the wide shoulder lateral groove 8A is more than the axial groove width of the narrow shoulder lateral groove 8B.

The open ends 11a of the first middle outward slots 11 respectively face the open ends 8Aa of the wide shoulder lateral grooves 8A, and the open ends 12a of the second middle outward slots 12 respectively face the open ends 8Ba of the narrow shoulder lateral grooves 8B as explained above.

As explained above, since the shoulder lateral grooves 8 are the alternately arranged wide and narrow shoulder lateral grooves 8A and 8B having the difference average groove widths, synchronization of the pitch noise can be avoided, and the frequency spectrum of the tire noise can be dispersed. Thus, the noise performance can be further improved.

Comparison Tests

Based on the tread pattern shown in FIG. 1, pneumatic tires of size 285/60R18 (rim size 18×8 J) for 4WD having specifications show in Table 1 were prepared and tested for the noise performance and mud performance.

All of the tires had the same specifications except for those shown in Table 1.

(1) Noise Performance Test

A four-wheel-drive car (4700 cc land cruiser) provided on the four wheels with test tires (tire pressure 230 kPa) was coasted at a speed of 70 km/h on a smooth and well-paved asphalt road in a straight test course, and the noise sound was evaluated by the test driver into 10 ranks, wherein the higher rank number is better and the comparative example 1 was rank 6. The results are shown in Table 1, (2) Mud Performance Test On a tire test course covered with mud of about 20 cm depth, in the stopped state of the above-mentioned test car, the engine was revved up to 3000 rpm and suddenly the clutch was engaged to start the test car with the first gear. And the initial stage acceleration (initial stage G) and longitudinal grip at the time were evaluated by the test driver into ten ranks, wherein the higher rank number is better and the comparative example 1 was rank 6. The results are shown in Table 1.

As apparent from the test results, embodiment tires Ex.1-Ex.4 were superior in both of the mud performance and noise performance to comparative tires Ref.1-Ref.5.

REFERENCE SIGNS LIST 2 tread portion
3 shoulder main groove
4 crown main groove
5 shoulder land zone
6 middle land zone
6C widthwise center line of middle land zone
8 shoulder lateral groove
8a open end of shoulder lateral groove
8A wide shoulder lateral groove
8Aa open end of wide shoulder lateral groove
8B narrow shoulder lateral groove
8Ba open end of narrow shoulder lateral groove
9 shoulder block
11 first middle outward slot
11a open end of first middle outward slot
13 second middle outward slot
12a open end of second middle outward slot
13 middle inward slot
14 connecting sipe
20 shoulder blocks' row
21 circumferential rib
Te tread edge

The invention claimed is:

1. A pneumatic tire comprising a tread portion provided with circumferentially extending main grooves,
wherein the main grooves are a pair of shoulder main grooves disposed one on each side of the tire equator to define a shoulder land zone axially outside each said shoulder main groove, and two crown main grooves disposed between the shoulder main grooves to define a middle land zone between each said shoulder main groove and the adjacent crown main groove,
wherein
each of the shoulder main grooves and the crown main grooves is a zigzag groove having a trapezoidal waveform, the configurations of the two crown main grooves being rotationally symmetrical about a point on the tire equator,
each of the shoulder land zones is provided with shoulder lateral grooves extending axially outwardly from the shoulder main groove to the adjacent tread edge so that the shoulder land zone is divided into circumferentially arranged shoulder blocks in a row,

TABLE 1

| Tire | Ref. 1 | Ex. 1 | Ref. 2 | Ref. 3 | Ref. 4 | Ref. 5 | Ex. 2 | Ex. 3 | Ex. 4 |
| --- | --- | --- | --- | --- | --- | --- | --- | --- | --- |
| Tread pattern (FIG. No.) | 6 | 1 | 5(A) | 5(B) | 5(C) | 5(D) | 1 | 1 | 1 |
| First middle outward slots | present | present | present | present | present | present | present | present | present |
| angle θ1 (deg.) | 20 | 20 | 20 | −6 | 20 | 20 | 20 | 20 | 20 |
| taper angle α (deg.) | 0 | 11.5 | 11.5 | 11.5 | 0 | 11.5 | 11.5 | 5 | 15 |
| Do open ends face those of shoulder lateral grooves? | no | yes | no | yes | yes | yes | yes | yes | yes |
| Second middle outward slots | absent | present | present | present | present | present | present | present | present |
| angle θ2 (deg.) | — | 34 | 34 | 34 | 34 | 20 | 34 | 34 | 34 |
| taper angle α (deg.) | — | 8 | 8 | 8 | 0 | 8 | 8 | 5 | 15 |
| inclining direction (*1) | — | same | same | reverse | same | same | same | same | same |
| Connecting sipe | — | present | present | present | present | present | absent | present | present |
| Do open ends face those of shoulder lateral grooves? | — | yes | no | yes | yes | yes | yes | yes | yes |
| Noise performance | 6 | 6 | 6 | 6 | 6 | 5.5 | 6 | 6 | 6 |
| Mud performance | | | | | | | | | |
| initial stage G | 6 | 7.5 | 6.8 | 6.5 | 6.7 | 6.5 | 7.4 | 7.2 | 7.2 |
| longitudinal grip | 6 | 8 | 6.9 | 6.9 | 7.1 | 7.1 | 7.9 | 7.6 | 7.4 |

(*1) same: the inclining direction of the first middle outward slots is the same as that of the second middle outward slots.
reverse: the inclining direction of the first middle outward slots is reverse to that of the second middle outward slots.

each of the middle land zones is provided with first middle outward slots and second middle outward slots which are arranged alternately in the tire circumferential direction, the first middle outward slots extend from the shoulder main groove toward the axially inside beyond the widthwise center line of the middle land zone, while gradually decreasing the width with the widthwise center line inclining with respect to the tire axial direction at a substantially constant angle $\theta 1$ of 5 to 20 degrees, and terminate within the middle land zone, the second middle outward slots extend from the shoulder main groove toward the axially inside beyond the widthwise center line of the middle land zone, while gradually decreasing the width with the widthwise center line inclining with respect to the tire axial direction at a substantially constant angle $\theta 2$ which is greater than the angle $\theta 1$ toward the same direction as the first middle outward slots, and terminate within the middle land zone, wherein the difference ($\theta 2 - \theta 1$) between the angle $\theta 1$ and the angle $\theta 2$ is 10 to 35 degrees, each of the middle land zones is not provided with any lateral groove extending across the entire width of the middle land zone and having a groove width of not less than 2 mm along its length so that the middle land zone is formed as a circumferential rib in substance, and the open ends of the first and second middle outward slots at the shoulder main groove respectively face the open ends of the shoulder lateral grooves at the shoulder main groove.

2. The pneumatic tire according to claim 1, wherein each of the middle land zones is further provided with middle inward slots, and the middle inward slots extend from the crown main groove toward the axially outside beyond the widthwise center line of the middle land zone and terminate within the middle land zone.

3. The pneumatic tire according to claim 1 or 2, wherein the shoulder lateral grooves are wide shoulder lateral grooves and narrow shoulder lateral grooves which are arranged alternately in the tire circumferential direction, and the wide shoulder lateral groove has an average groove width more than that of the narrow shoulder lateral groove.

4. The pneumatic tire according to claim 3, wherein the open ends of the first middle outward slots respectively face the open ends of the wide shoulder lateral grooves.

5. The pneumatic tire according to claim 1, wherein the axially inner ends of the first middle outward slots or alternatively the axially inner ends of the second middle outward slots are connected to the crown main groove through sipes having a groove width of less than 2 mm.

6. The pneumatic tire according to claim 1, wherein each of the middle land zones is provided with middle inward slots, and the middle inward slots extend from the crown main groove toward the axially outside beyond the widthwise center line of the middle land zone, while inclining in the same direction as the first and second middle outward slots at a substantially constant angle $\theta 3$ with respect to the axial direction, angle $\theta 3$ being not less than the angle $\theta 1$ and not more than the angle $\theta 2$, and terminate within the middle land zone.

7. The pneumatic tire according to claim 1, wherein each of the main grooves is made up of axially inner straight segments, axially outer straight segments, and oblique segments extending therebetween, and the first middle outward slots and the second middle outward slots are alternatively extended from the axially inner straight segments.

8. The pneumatic tire according to claim 1, wherein the axially inner ends of the first middle outward slots and the second middle outward slots are positioned at the substantially same axial position.

9. A pneumatic tire comprising a tread portion provided with circumferentially extending main grooves, wherein the main grooves are a pair of shoulder main grooves disposed one on each side of the tire equator to define a shoulder land zone axially outside each said shoulder main groove, and one crown main groove disposed between the shoulder main grooves to define a middle land zone between each said shoulder main groove and the crown main groove, wherein each of the shoulder main grooves and the crown main grooves is a zigzag groove having a trapezoidal waveform, each of the shoulder land zones is provided with shoulder lateral grooves extending axially outwardly from the shoulder main groove to the adjacent tread edge so that the shoulder land zone is divided into circumferentially arranged shoulder blocks in a row, each of the middle land zones is provided with first middle outward slots and second middle outward slots which are arranged alternately in the tire circumferential direction, the first middle outward slots extend from the shoulder main groove toward the axially inside beyond the widthwise center line of the middle land zone, while gradually decreasing the width with the widthwise center line inclining with respect to the tire axial direction at a substantially constant angle $\theta 1$ of 5 to 20 degrees, and terminate within the middle land zone, the second middle outward slots extend from the shoulder main groove toward the axially inside beyond the widthwise center line of the middle land zone, while gradually decreasing the width with the widthwise center line inclining with respect to the tire axial direction at a substantially constant angle $\theta 2$ which is greater than the angle $\theta 1$ toward the same direction as the first middle outward slots, and terminate within the middle land zone, wherein the difference ($\theta 2 - \theta 1$) between the angle $\theta 1$ and the angle $\theta 2$ is 10 to 35 degrees, each of the middle land zones is not provided with any lateral groove extending across the entire width of the middle land zone and having a groove width of not less than 2 mm along its length so that the middle land zone is formed as a circumferential rib in substance, and the open ends of the first and second middle outward slots at the shoulder main groove respectively face the open ends of the shoulder lateral grooves at the shoulder main groove.

10. The pneumatic tire according to claim 9, wherein each of the middle land zones is further provided with middle inward slots, and the middle inward slots extend from the crown main groove toward the axially outside beyond the widthwise center line of the middle land zone and terminate within the middle land zone.

11. The pneumatic tire according to claim 9, wherein
the shoulder lateral grooves are wide shoulder lateral grooves and narrow shoulder lateral grooves which are arranged alternately in the tire circumferential direction, and the wide shoulder lateral groove has an average groove width more than that of the narrow shoulder lateral groove.

12. The pneumatic tire according to claim 11, wherein
the open ends of the first middle outward slots respectively face the open ends of the wide shoulder lateral grooves.

13. The pneumatic tire according to claim 9, wherein
the axially inner ends of the first middle outward slots or alternatively the axially inner ends of the second middle outward slots are connected to the crown main groove through sipes having a groove width of less than 2 mm.

14. The pneumatic tire according to claim 9, wherein
each of the middle land zones is provided with middle inward slots, and the middle inward slots extend from the crown main groove toward the axially outside beyond the widthwise center line of the middle land zone, while inclining in the same direction as the first and second middle outward slots at a substantially constant angle $\theta 3$ with respect to the axial direction, angle $\theta 3$ being not less than the angle $\theta 1$ and not more than the angle $\theta 2$, and terminates within the middle land zone.

15. The pneumatic tire according to claim 9, wherein
each of the main grooves is made up of axially inner straight segments, axially outer straight segments, and oblique segments extending therebetween, and the first second middle outward slots and the second middle outward slots are alternately extended from the axially inner straight segments.

16. The pneumatic tire according to claim 9, wherein
the axially inner ends of the first middle outward slots and the second middle outward slots are positioned at the substantially same axial position.

\* \* \* \* \*